(12) United States Patent
Kimura (10) Patent No.: US 12,146,450 B2
(45) Date of Patent: Nov. 19, 2024

(54) INTERNAL COMBUSTION ENGINE

(71) Applicant: TOYOTA JIDOSHA KABUSHIKI KAISHA, Toyota (JP)

(72) Inventor: Koshiro Kimura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 18/147,828

(22) Filed: Dec. 29, 2022

(65) Prior Publication Data

US 2023/0287845 A1  Sep. 14, 2023

(30) Foreign Application Priority Data

Mar. 9, 2022 (JP) ................................. 2022-036421

(51) Int. Cl.
*F02D 41/40* (2006.01)
*F02D 41/30* (2006.01)

(52) U.S. Cl.
CPC ....... *F02D 41/402* (2013.01); *F02D 41/3017* (2013.01)

(58) Field of Classification Search
CPC .......................... F02D 41/402; F02D 41/3017
See application file for complete search history.

(56) References Cited

U.S. PATENT DOCUMENTS

| | | | | |
|---|---|---|---|---|
| 6,092,501 A | * | 7/2000 | Matayoshi | F02B 23/104 123/301 |
| 2016/0115880 A1 | * | 4/2016 | Kondo | F02P 3/0453 123/406.55 |
| 2019/0093575 A1 | * | 3/2019 | Inoue | F02P 5/045 |
| 2020/0109682 A1 | | 4/2020 | Kassai et al. | |
| 2020/0141336 A1 | * | 5/2020 | Inoue | F02D 13/02 |
| 2020/0378334 A1 | * | 12/2020 | Imamura | F02F 1/242 |
| 2021/0033042 A1 | * | 2/2021 | Hitomi | F02D 41/3041 |
| 2021/0231077 A1 | * | 7/2021 | Matsumoto | F02B 31/085 |
| 2021/0239068 A1 | * | 8/2021 | Matsumoto | F02D 41/401 |

FOREIGN PATENT DOCUMENTS

WO  WO 2018/229932 A1  12/2018

OTHER PUBLICATIONS

U.S. Appl. No. 17/929,039, filed Sep. 1, 2022, Ryota Yamada.

* cited by examiner

*Primary Examiner* — George C Jin
(74) *Attorney, Agent, or Firm* — Oblon, McClelland, Maier & Neustadt, L.L.P.

(57) ABSTRACT

A control apparatus for an internal combustion engine carries out lean combustion to cause flame propagation to a homogeneous air-fuel mixture while drifting primary flames on a tumble flow by injecting fuel for ignition from a second fuel injection valve to a vicinity of an electrode portion and igniting an air-fuel mixture for ignition at a primary ignition timing, and to ignite an air-fuel mixture for accelerating combustion at a secondary ignition timing by injecting fuel for accelerating combustion in a squish area from the second fuel injection valve at a timing before an injection timing of the fuel for ignition and drifting the air-fuel mixture for accelerating combustion in a combustion chamber on the tumble flow. The secondary ignition timing is set as a timing allowing secondary flames produced by igniting the air-fuel mixture for accelerating combustion to be drawn into the squish area by a reverse squish flow.

4 Claims, 7 Drawing Sheets

TUMBLE FLOW

INTERNAL COMBUSTION ENGINE

CROSS-REFERENCE TO RELATED APPLICATION

This application claims priority to Japanese Patent Application No. 2022-036421 filed on Mar. 9, 2022, incorporated herein by reference in its entirety.

BACKGROUND

1. Technical Field

The disclosure relates to an internal combustion engine.

2. Description of Related Art

In WO 2018/229932, there is disclosed a conventional internal combustion engine that is configured to inject part of fuel per combustion cycle in a first period from an intake stroke to the first half of a compression stroke, and inject at least part of the remaining fuel in a second period immediately before an ignition timing in the second half of the compression stroke, with a view to forming and burning a stratified air-fuel mixture with an air excess ratio close to 2.0 (an air excess ratio corresponding to an air-fuel ratio of 28 to 32).

SUMMARY

In the case where lean combustion is carried out to form and burn an air-fuel mixture that is leaner than an air-fuel mixture with a theoretical air-fuel ratio as a whole in a combustion chamber, the speed of combustion (the speed of flame propagation) is low because of the leanness of the air-fuel mixture. Therefore, it is necessary to accelerate combustion (flame propagation) by enhancing the degree of fluidity and turbulence of the gas in the combustion chamber. As a method of accelerating the combustion of the air-fuel mixture, it is effective, for example, to produce a tumble flow in the combustion chamber, provide a squish area in an outer peripheral portion of the combustion chamber, produce a squish flow and a reverse squish flow in the combustion chamber in the vicinity of a compression top dead center, and thus boost the degree of fluidity and turbulence of the gas in the combustion chamber.

However, in the case where the degree of fluidity and turbulence of the gas in the combustion chamber is thus boosted by producing the squish flow and the reverse squish flow while producing the tumble flow in the combustion chamber, flames drifting on the tumble flow may be biased toward one side in the combustion chamber at a timing when the reverse squish flow is produced. In this case, the flames cannot be drawn into the squish area on the other side in the combustion chamber. As a result, the combustion in the squish area cannot be accelerated, which may lead to an increase in the amount of unburnt HC in exhaust gas.

The disclosure has been made in view of this problem. It is an object of the disclosure to suppress the production of unburnt HC through the acceleration of combustion in a squish area, while boosting the degree of fluidity and turbulence of the gas in a combustion chamber by producing a tumble flow and producing a squish flow and a reverse squish flow in the combustion chamber.

In order to solve the foregoing problem, an internal combustion engine according to one aspect of the disclosure is equipped with an engine body having a combustion chamber in which a squish area is formed, an ignition plug in which an electrode portion is arranged in such a manner as to face the combustion chamber, a first fuel injection valve that injects fuel into an intake passage or the combustion chamber of the engine body, a second fuel injection valve that injects fuel into the combustion chamber, and a control apparatus. The engine body is configured to be able to produce a tumble flow passing the electrode portion in the combustion chamber. The second fuel injection valve is configured to directly inject fuel toward the electrode portion in the same direction as a flow direction of the tumble flow. The control apparatus is configured to carry out lean combustion to cause flame propagation to a homogeneous air-fuel mixture while drifting primary flames produced by igniting an air-fuel mixture for ignition on the tumble flow, by injecting fuel for forming the homogeneous air-fuel mixture from the first fuel injection valve into the combustion chamber, and injecting fuel for ignition for forming the air-fuel mixture for ignition from the second fuel injection valve to a vicinity of the electrode portion to ignite the air-fuel mixture for ignition at a primary ignition timing. Furthermore, the control apparatus is configured to inject, from the second fuel injection valve, fuel for accelerating combustion in the squish area at a timing before an injection timing of the fuel for ignition, and ignite an air-fuel mixture for accelerating combustion that is formed by the fuel for accelerating combustion at a secondary ignition timing after the primary ignition timing by drifting the air-fuel mixture for accelerating combustion in the combustion chamber on the tumble flow. The secondary ignition timing is set as a timing that allows secondary flames produced by igniting the air-fuel mixture for accelerating combustion to be drawn into the squish area by a reverse squish flow.

According to this aspect of the disclosure, while the primary flames produced at the primary ignition timing can be drifted toward one side of the combustion chamber on the tumble flow, the secondary flames produced at the secondary ignition timing after the primary ignition timing can be made present on the other side of the combustion chamber. Therefore, even in the case where the squish flow and the reverse squish flow are produced to boost the degree of fluidity and turbulence of the gas in the combustion chamber in addition to producing the tumble flow in the combustion chamber, the primary flames and the secondary flames can be drawn into the squish area by the reverse squish flow, so the production of unburnt HC can be suppressed by accelerating combustion in the squish area as a whole.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The embodiments of the disclosure will be described hereinafter in detail with reference to the drawings. Incidentally, like components will be denoted by like reference numerals in the following description.

Figure 1:
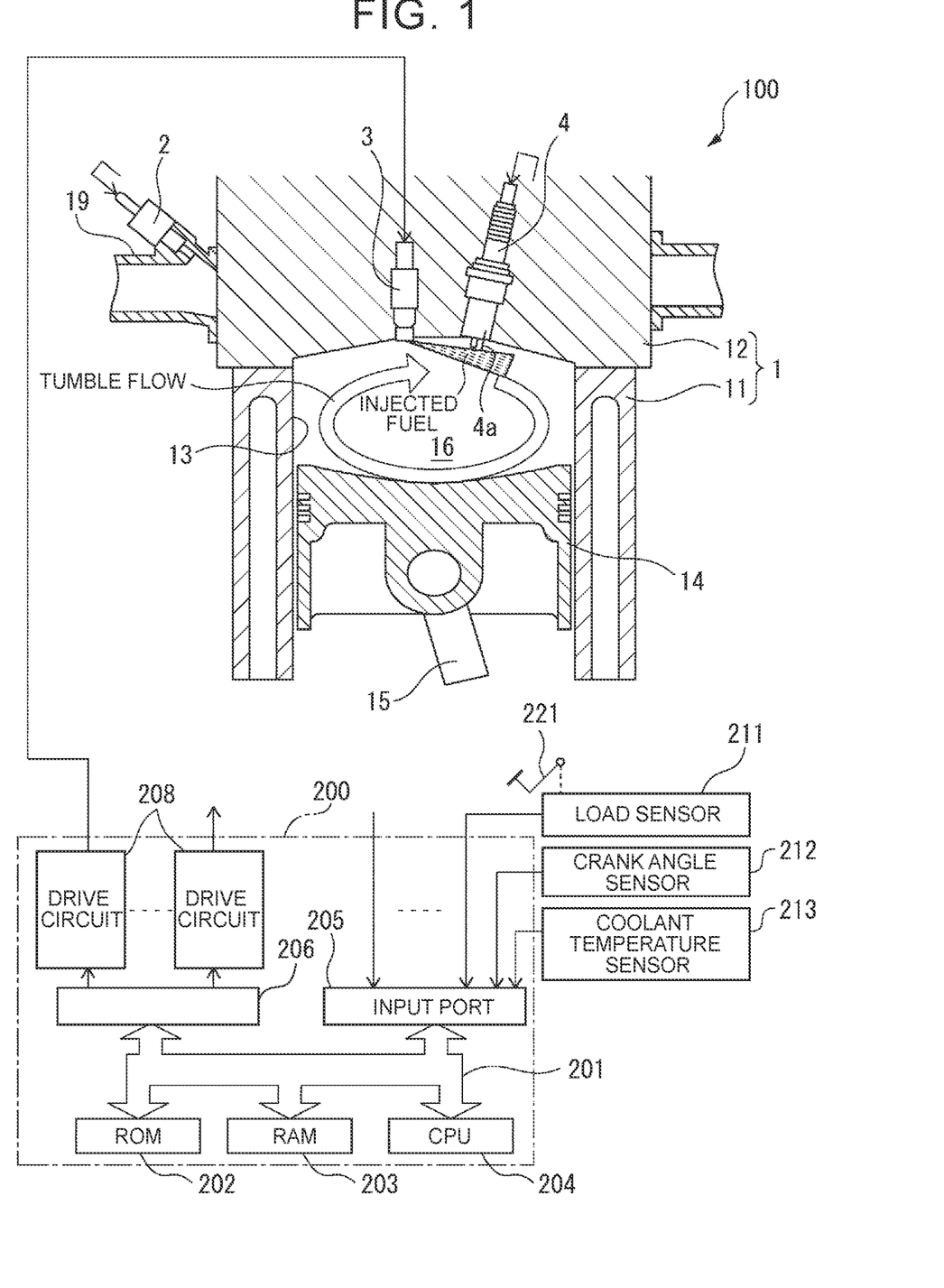
FIG. 1 is a schematic configuration view of a spark ignition internal combustion engine according to one of the embodiments of the disclosure, and an electronic control unit that controls the internal combustion engine.

FIG. 1 is a schematic configuration view of a spark ignition internal combustion engine 100 according to one of the embodiments of the disclosure.

As shown in FIG. 1, the internal combustion engine 100 is equipped with an engine body 1, a first fuel injection valve 2, a second fuel injection valve 3, an ignition plug 4, and an electronic control unit 200.

The engine body 1 is equipped with a cylinder block 11, and a cylinder head 12 fixed to the cylinder block 11.

Figure 2:
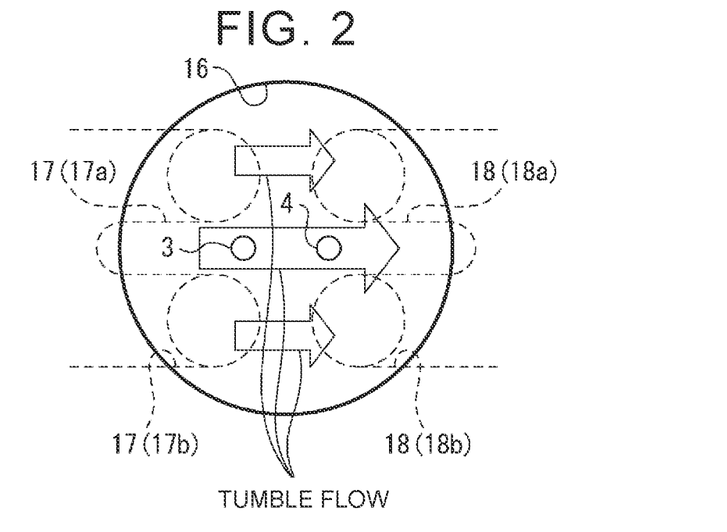
FIG. 2 is a schematic view of a combustion chamber as viewed from a cylinder head side.

At least one cylinder 13 is formed in the cylinder block 11. A piston 14 that moves in a reciprocating manner inside the cylinder 13 upon receiving the pressure of combustion is accommodated inside the cylinder 13. The piston 14 is coupled to a crankshaft (not shown) via a connecting rod 15. The reciprocating motion of the piston 14 is converted into rotational motion by the crankshaft. A space defined by an inner wall surface of the cylinder head 12, an inner wall surface of the cylinder 13, and a crest surface of the piston 14 serves as the combustion chamber 16. FIG. 2 is a schematic view of the combustion chamber 16 as viewed from the cylinder head 12 side. Each of FIG. 3A and FIG. 3B is a schematic cross-sectional view of the combustion chamber 16 at the time when the piston 14 is located in the vicinity of a top dead center.

Figure 3A:
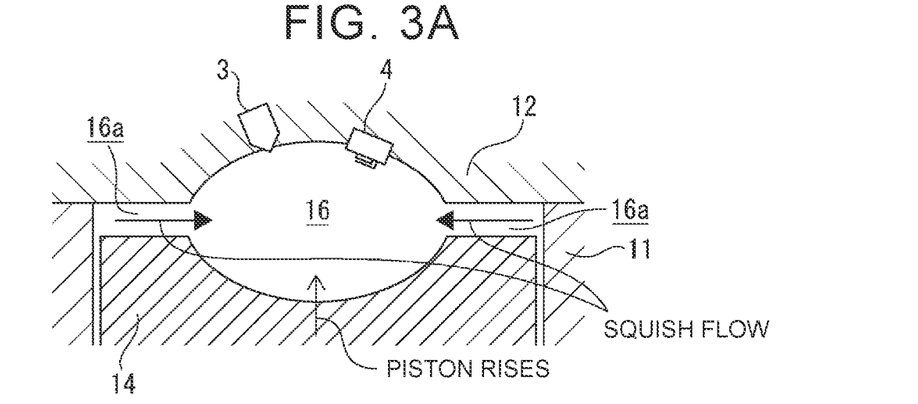
FIG. 3A is a schematic cross-sectional view of the combustion chamber at the time when a piston is located in the vicinity of a top dead center.
Figure 3B:
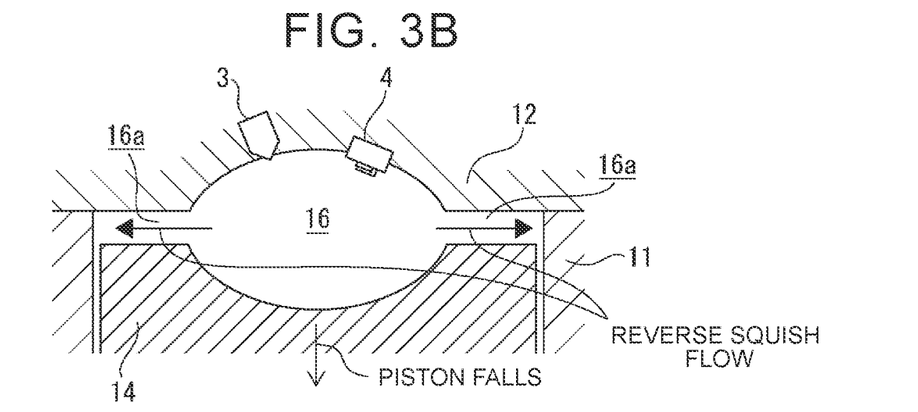
FIG. 3B is another schematic cross-sectional view of the combustion chamber at the time when the piston is located in the vicinity of the top dead center.

As shown in FIG. 3A and FIG. 3B, in the engine body 1 according to the present embodiment, the shapes of the cylinder head 12 and the piston 14 are adjusted such that a squish area 16a is formed in the combustion chamber 16. The squish area 16a is a space sandwiched by the crest surface of a peripheral edge portion of the piston 14 and the inner wall surface of the cylinder head 12 (a top surface of the combustion chamber 16).

By providing the squish area 16a, an extrusion flow (hereinafter referred to as "a squish flow") from the squish area 16a toward a central portion of the combustion chamber 16 can be produced as the piston 14 rises in a compression stroke, as shown in FIG. 3A. Besides, a draw-in flow (hereinafter referred to as "a reverse squish flow") from the central portion of the combustion chamber 16 toward the squish area 16a can be produced as the piston 14 falls in an expansion stroke, as shown in FIG. 3B. By producing the squish flow and the reverse squish flow in the combustion chamber 16 in this manner, the degree of fluidity and turbulence of the gas in the combustion chamber 16 can be enhanced to accelerate combustion (flame propagation).

An intake port 17 (see FIG. 2) constituting part of an intake passage, and an exhaust port 18 (see FIG. 2) constituting part of an exhaust passage are formed in the cylinder head 12. The intake port 17 and the exhaust port 18 bifurcate inside the cylinder head 12. A pair of intake ports 17a and 17b into which the intake port 17 bifurcates, and a pair of exhaust ports 18a and 18b into which the exhaust port 18 bifurcates open in the combustion chamber 16.

In the present embodiment, a tumble flow is formed in the combustion chamber 16 by the intake air flowing into the combustion chamber 16 via the intake port 17, by adjusting the shape of the intake port 17 and the shape of the combustion chamber 16. After flowing from the intake port 17 into the combustion chamber 16, the tumble flow according to the present embodiment first flows from the intake port 17 side (on the left side in FIG. 2) to the exhaust port 18 side (on the right side in FIG. 2) along the top surface of the combustion chamber 16 (the inner wall surface of the cylinder head 12), and then flows to the piston 14 side along the inner wall surface of the cylinder 13 on the exhaust port 18 side, as indicated by an arrow in FIG. 1. Then after flowing from the exhaust port 18 side to the intake port 17 side along the crest surface of the piston 14, the tumble flow flows to the intake port 17 side along the inner wall surface of the cylinder 13 on the intake port 17 side.

Incidentally, the method of forming the tumble flow in the combustion chamber 16 may not necessarily be a method of adjusting the shape of the intake port 17 and the shape of the combustion chamber 16 in this manner. For example, the tumble flow may be formed by providing a control valve that deflects the flow of intake air flowing through the interior of the intake port 17 in the intake port 17 and adjusting the opening degree of the control valve.

Although not shown in the drawings, an intake valve for opening/closing the opening between the combustion chamber 16 and the intake port 17, an exhaust valve for opening/closing the opening between the combustion chamber 16 and the exhaust port 18, an intake camshaft that drives the intake valve in an opening/closing direction thereof, and an exhaust camshaft that drives the exhaust valve in an opening/closing direction thereof are attached to the cylinder head 12.

The first fuel injection valve 2 is attached to, for example, an intake manifold 19 constituting part of the intake passage such that fuel can be injected into the intake port 17. The open time period (injection amount) and opening timing (injection timing) of the first fuel injection valve 2 are changed in accordance with a control signal from the electronic control unit 200. When the first fuel injection valve 2 is opened, fuel is injected from the first fuel injection valve 2 into the intake port 17, and is supplied to the combustion chamber 16. Incidentally, the first fuel injection valve 2 may be attached to, for example, the cylinder head 12 such that fuel can be directly injected into the combustion chamber 16.

The second fuel injection valve 3 is attached to the cylinder head 12 such that fuel can be injected in the same direction as the flow direction of the tumble flow flowing from the intake port 17 side to the exhaust port 18 side along the top surface of the combustion chamber 16, and that fuel can be directly injected toward a space in the vicinity of an electrode portion 4a of the ignition plug 4. In the present embodiment, the second fuel injection valve 3 is attached between the intake ports 17a and 17b, as shown in FIG. 2. The open time period (injection amount) and opening timing (injection timing) of the second fuel injection valve 3 are changed in accordance with a control signal from the electronic control unit 200. When the second fuel injection valve 3 is opened, fuel is injected from the second fuel injection valve 3 into the combustion chamber 16, and is supplied to the combustion chamber 16.

Figure 4:
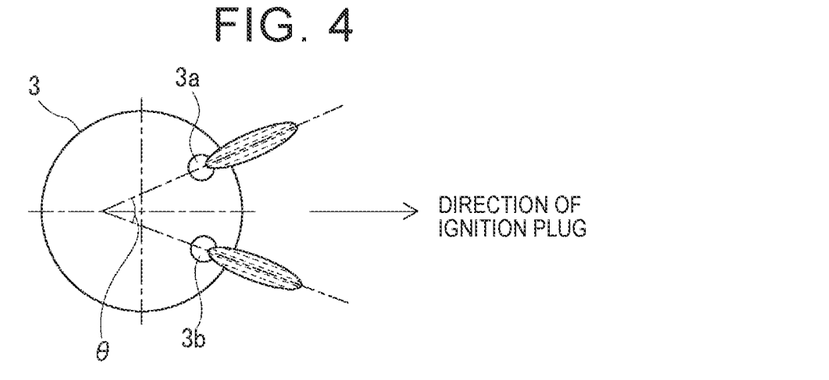
FIG. 4 is a schematic view of a second fuel injection valve as viewed from the piston side.

Incidentally, FIG. 4 is a schematic view of the second fuel injection valve 3 as viewed from the piston 14 side. As shown in FIG. 4, the second fuel injection valve 3 according to the present embodiment is equipped with two injection holes 3a and 3b from which fuel is sprayed in the direction of the electrode portion 4a of the ignition plug 4. The two injection holes 3a and 3b are provided such that an angle θ between centers of sprays of fuel injected from the injection holes 3a and 3b respectively becomes equal to or smaller than 30°. By limiting the angle θ between the centers of the sprays of fuel injected from the injection holes 3a and 3b respectively to an angle equal to or smaller than 30° in this manner, the sprays of fuel injected from the injection holes 3a and 3b respectively pull each other while involving ambient air, so the directions of the sprays of fuel coincide with each other. As a result, the direction of each of the sprays of fuel can be made to coincide with the direction of the electrode portion 4a of the ignition plug 4 as if fuel were injected from a single injection hole toward the electrode portion 4a of the ignition plug 4.

The ignition plug 4 is attached to the cylinder head 12 such that the electrode portion 4a thereof faces the combustion chamber 16. In the present embodiment, the ignition plug 4 is attached between the exhaust ports 18a and 18b as shown in FIG. 2. The ignition plug 4 produces a spark in the combustion chamber 16, and ignites a mixture of fuel and air formed in the combustion chamber 16. The ignition timing of the ignition plug 4 is controlled to an arbitrary timing in accordance with a control signal from the electronic control unit 200.

The electronic control unit 200 is configured as a digital computer, and is equipped with a read only memory (ROM) 202, a random access memory (RAM) 203, a microprocessor (CPU) 204, an input port 205, and an output port 206 that are connected to one another by a bidirectional bus 201.

An output signal of a load sensor 211 that generates an output voltage proportional to a depression amount of an accelerator pedal 221 (hereinafter referred to as "an accelerator depression amount") is input to the input port 205 as a signal for detecting an engine load. Besides, an output signal of a crank angle sensor 212 that generates an output pulse every time the crankshaft of the engine body 1 rotates by, for example, 15° is input to the input port 205 as a signal for calculating an engine rotational speed or the like. Besides, an output signal of a coolant temperature sensor 213 that detects a temperature of coolant for cooling the engine body 1 (hereinafter referred to as "an engine coolant temperature") is input to the input port 205 as a signal for detecting a temperature of the engine body 1. Incidentally, the signal for detecting the temperature of the engine body 1 may not necessarily be the output signal of the coolant temperature sensor 213. For example, in the case where an oil temperature sensor that detects a temperature of lubricating oil for lubricating friction sliding portions of the engine body 1 is provided, an output signal of the oil temperature sensor may be used. As described hitherto, output signals of various sensors that are needed to control the internal combustion engine 100 are input to the input port 205.

The output port 206 is connected to various control components such as the first fuel injection valve 2, the second fuel injection valve 3, and the ignition plug 4 via corresponding drive circuits 208 respectively.

The electronic control unit 200 outputs control signals for controlling the respective control components from the output port 206, based on the output signals of the various sensors input to the input port 205, and thus controls the internal combustion engine 100.

The control of the internal combustion engine 100 that is performed by the electronic control unit 200 will be described hereinafter.

The electronic control unit 200 changes over the operation mode of the engine body 1 to a stoichiometric combustion mode or a lean combustion mode in accordance with the temperature of the engine body 1 (the engine coolant temperature in the present embodiment). In concrete terms, the electronic control unit 200 changes over the operation mode of the engine body 1 to the stoichiometric combustion mode when the temperature of the engine body 1 is lower than a predetermined temperature, namely, when the engine is cold with the ignitability of the air-fuel mixture and hence the stability of combustion being relatively low. On the other hand, the electronic control unit 200 changes over the operation mode of the engine body 1 to the lean combustion mode when the temperature of the engine body 1 is equal to or higher than the predetermined temperature.

When the operation mode is the stoichiometric combustion mode, the electronic control unit 200 forms a homogeneous air-fuel mixture with an air-fuel ratio equal or close to a theoretical air-fuel ratio in the combustion chamber 16, ignites the homogeneous air-fuel mixture to cause homogeneous combustion with flame propagation, and thus operates the engine body 1.

In concrete terms, when the operation mode is the stoichiometric combustion mode, the electronic control unit 200 injects a target fuel injection amount of fuel corresponding to a required torque from the first fuel injection valve 2, in an arbitrary period from an exhaust stroke on the last combustion cycle to an intake stroke on the current combustion cycle, and hence forms a homogeneous air-fuel mixture with an air-fuel ratio equal or close to the theoretical air-fuel ratio in the combustion chamber 16. The electronic control unit 200 then causes combustion with flame propagation to operate the engine body 1, by igniting the homogeneous air-fuel mixture through the use of the ignition plug 4 at an optimal ignition timing (a knock limit ignition timing in the case where the optimal ignition timing is advanced with respect to the knock limit ignition timing).

On the other hand, when the operation mode is the lean combustion mode, the electronic control unit 200 carries out lean combustion by forming a stratified air-fuel mixture leaner than an air-fuel mixture with the theoretical air-fuel ratio as a whole in the combustion chamber 16, and operates the engine body 1. The stratified air-fuel mixture has an air excess ratio $\lambda_0$ set equal to or larger than, for example, 2.0. In the present embodiment, the air excess ratio $\lambda_0$ is set close to 3.0.

Figure 5:
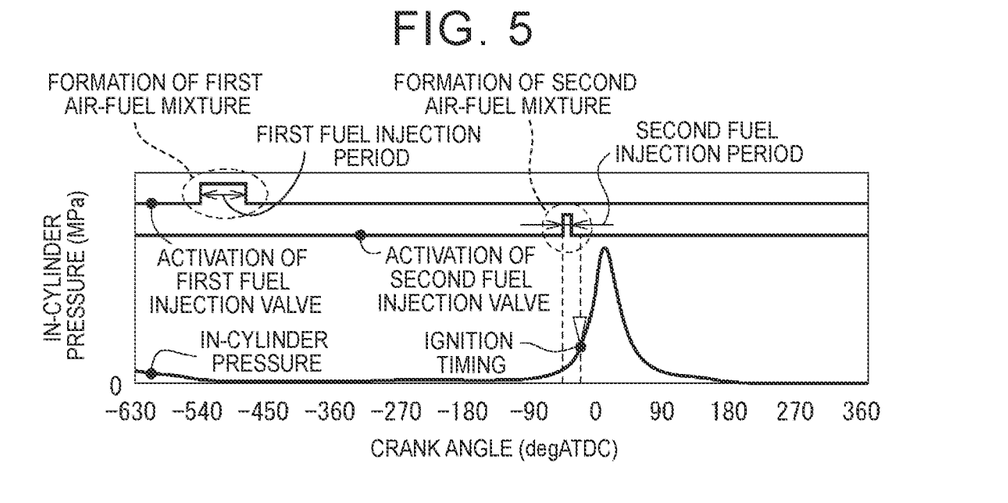
FIG. 5 is a view showing an example of fuel injection timings of a first fuel injection valve and the second fuel injection valve and an ignition timing in the case where lean combustion is carried out, with an axis of ordinate representing in-cylinder pressure (MPa) and an axis of abscissa representing crank angle (deg. ATDC)

FIG. 5 is a view showing an example of the fuel injection timings of the first fuel injection valve 2 and the second fuel injection valve 3 and the ignition timing in the case where lean combustion is carried out, with the axis of ordinate representing in-cylinder pressure (MPa) and with the axis of abscissa representing crank angle (deg. after top dead center (ATDC)).

In the example shown in FIG. 5, when lean combustion is carried out, first fuel is first injected from the first fuel injection valve 2 in an arbitrary period from an exhaust stroke on the last combustion cycle to an intake stroke on the current combustion cycle and thereby diffused into the entire combustion chamber 16, and a homogeneous air-fuel mixture (hereinafter referred to as "a first air-fuel mixture") leaner than an air-fuel mixture with the theoretical air-fuel ratio is formed in the combustion chamber 16.

Subsequently, second fuel for assisting ignition (fuel for ignition) is injected from the second fuel injection valve 3 toward the space in the vicinity of the electrode portion 4a of the ignition plug 4 during a compression stroke. Thus, before the second fuel is diffused into the entire combustion chamber 16, an air-fuel mixture for ignition (hereinafter referred to as "a second air-fuel mixture") containing a higher ratio of fuel than the first air-fuel mixture is temporarily formed in the vicinity of the electrode portion 4a of the ignition plug 4, and a stratified air-fuel mixture is thus formed in the combustion chamber 16. The second air-fuel mixture is then ignited to propagate flames from the second air-fuel mixture to the first air-fuel mixture and burn the stratified air-fuel mixture with flame propagation, thereby operating the engine body 1.

By temporarily forming the second air-fuel mixture containing a relatively high ratio of fuel in the vicinity of the electrode portion 4a of the ignition plug 4 and igniting the second air-fuel mixture in this manner, the occurrence of a misfire can be prevented even in the case where, for example, a lean stratified air-fuel mixture with an air excess ratio exceeding 2.0 is formed in the combustion chamber 16. As a result, the combustion stability of the stratified air-fuel mixture can be ensured. Then, as the degree of leanness of the stratified air-fuel mixture is increased, the discharge amount of NOx can be reduced by lowering the combustion temperature.

On the other hand, in the case where the air excess ratio $\lambda_0$ of the stratified air-fuel mixture remains unchanged, the combustion stability of the stratified air-fuel mixture is enhanced as an air excess ratio $\lambda_2$ of the second air-fuel mixture is reduced (as the degree of richness of the second air-fuel mixture is increased). However, the combustion temperature of the second air-fuel mixture and hence the stratified air-fuel mixture rises, so the discharge amount of NOx increases.

Figure 6:
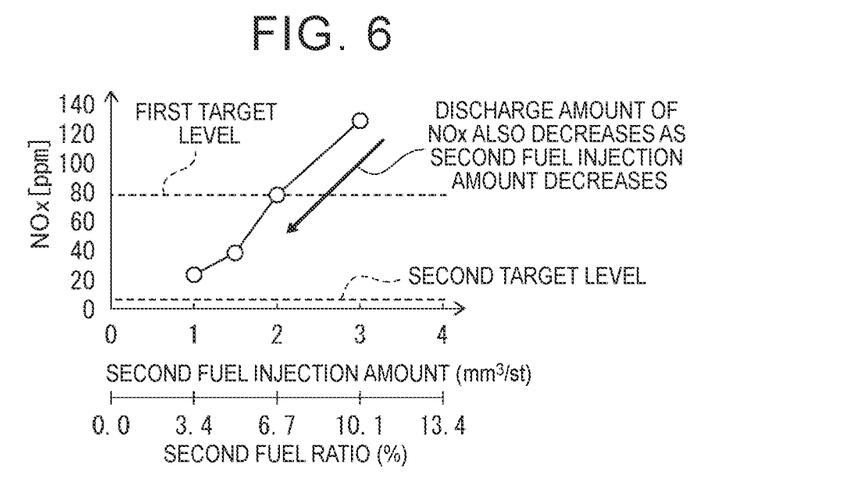
FIG. 6 is a view showing changes in a discharge amount of NOx in the case where only a second fuel injection amount, namely, an air excess ratio $\lambda_2$ of a second air-fuel mixture is changed without changing an air excess ratio $\lambda_0$ of a stratified air-fuel mixture on an operating condition that the engine load and the engine rotational speed remain unchanged.

FIG. 6 is a view showing changes in the discharge amount of NOx in the case where the ratio of the second fuel injection amount (hereinafter referred to as "a second fuel ratio") (%) to the entire fuel injection amount (approximately 30 (mm$^3$/st (stroke)) in this example) while the air excess ratio $\lambda_0$ of the stratified air-fuel mixture is constant ($\lambda_0$=2.7 in this example) without being changed and only the second fuel injection amount (mm$^3$/st) is changed, namely, in the case where only the air excess ratio $\lambda_2$ of the second air-fuel mixture is changed while the air excess ratio $\lambda_0$ of the stratified air-fuel mixture is not changed, on an operating condition that the engine load and the engine rotational speed remain unchanged.

As shown in FIG. 6, as the second fuel injection amount is reduced to lower the second fuel ratio, the degree of richness of the second air-fuel mixture also decreases. Therefore, the discharge amount of NOx can be reduced by lowering the combustion temperature of the second air-fuel mixture and hence the stratified air-fuel mixture.

Besides, a first target level and a second target level of the discharge amount of NOx at the time of the lean combustion mode are indicated by broken lines respectively in FIG. 6. The first target level approximately corresponds to the discharge amount of NOx at the time when the degree of leanness of a homogeneous air-fuel mixture leaner than an air-fuel mixture with the theoretical air-fuel ratio is increased to an ignition limit by the ignition of sparks in the case where lean homogeneous combustion for forming the homogeneous air-fuel mixture in the combustion chamber 16 to cause combustion with flame propagation is carried out to attempt to reduce the discharge amount of NOx. The second target level is a target value of the discharge amount of NOx that is more difficult to achieve than the first target level, and corresponds to a regulatory value of the discharge amount of NOx determined according to the European emission standards (EURO 7).

As shown in FIG. 6, it is understood that the second fuel injection amount must be held equal to or smaller than about 2.0 (mm$^3$/st) in order to achieve the first target level. It is also understood that the second fuel injection amount needs to be further reduced in order to achieve the second target level.

In other words, the minimum injection amount of the second fuel injection valve 3 needs to be made equal to or smaller than a predetermined first injection amount that allows the first target level to be achieved in order to achieve the first target level. The minimum injection amount of the second fuel injection valve 3 needs to be made equal to or smaller than a predetermined second injection amount that allows the second target level to be achieved in order to achieve the second target level.

"The minimum injection amount" of a fuel injection valve is a minimum injection amount in a full lift region of the fuel injection valve, and means a total amount of fuel that is injected while a changeover from a partial lift region to the full lift region is made, namely, while the lift amount of a needle valve of the fuel injection valve (hereinafter referred to as "a needle lift amount") changes from zero to a maximum lift amount. The partial lift region is an injection region where the needle lift amount of the fuel injection valve is smaller than the maximum lift amount, and the full lift region is an injection region after the attainment of the maximum lift amount by the needle lift amount of the fuel injection valve.

Incidentally, in the present embodiment, the needle lift amount, injection hole diameter, fuel pressure, and the like of the second fuel injection valve 3 are adjusted such that the minimum injection amount of the second fuel injection valve 3 becomes smaller than the second injection amount, and that the injection amount per unit time (hereinafter referred to as "a fuel injection rate") of the second fuel injection valve 3 in the full lift region approximately falls within a range of 1.0 (mm$^3$/ms) to 3.0 (mm$^3$/ms). The fuel injection rate of the second fuel injection valve 3 is thus confined within a certain range because of the following reason.

As the fuel injection rate of the second fuel injection valve 3 is reduced, the time needed to finish injecting a predetermined amount of fuel from the second fuel injection valve 3 lengthens. Therefore, when the fuel injection rate is made too low, the second fuel diffuses into the combustion chamber 16 before the end of injection of the second fuel from the second fuel injection valve 3. As a result, the air excess ratio $\lambda_2$ of the second air-fuel mixture cannot be held equal to or lower than a predetermined air excess ratio $\lambda_{thr}$ that allows stable ignition by the ignition plug 4. On the other hand, when the fuel injection rate of the second fuel injection valve 3 is made too high, the second fuel injection amount cannot be held equal to or smaller than the first injection amount or the second injection amount. That is, the appropriate second air-fuel mixture with an air excess ratio that allows stable ignition by the ignition plug 4 and that allows the discharge amount of NOx to be held equal to or smaller than the first target level or the second target level cannot be formed unless the fuel injection rate of the second fuel injection valve 3 is confined within a certain range.

By the way, when lean combustion is carried out, the speed of combustion (the speed of flame propagation) falls as the degree of leanness of the stratified air-fuel mixture is increased, so it is necessary to accelerate combustion (flame propagation) by enhancing the degree of fluidity and turbulence of the gas in the combustion chamber 16. In the present embodiment, therefore, the degree of fluidity and turbulence of the gas in the combustion chamber 16 is boosted by producing a tumble flow in the combustion chamber 16, providing the squish area 16a in an outer peripheral portion of the combustion chamber 16, and producing a squish flow and a reverse squish flow in the combustion chamber 16 in the vicinity of a compression top dead center.

It has been revealed, however, that when an attempt is made to boost the degree of fluidity and turbulence of the gas in the combustion chamber 16 by producing the tumble flow in the combustion chamber 16 and producing the squish flow and the reverse squish flow in this manner, the flames drifting on the tumble flow are biased toward one side in the combustion chamber 16, at a timing when the reverse squish flow is produced at the beginning of an expansion stroke, especially in the case where a lean stratified air-fuel mixture with an air excess ratio exceeding 2.0 is formed in the combustion chamber 16 to carry out lean combustion. It has been revealed, therefore, that the flames cannot be drawn into the squish area 16a on the other side in the combustion chamber 16, that the combustion in the squish area 16a cannot be accelerated, and that there is caused a problem in that the amount of unburnt HC in exhaust gas increases.

This problem will be described hereinafter with reference to FIGS. 7A to 7D. Each of FIGS. 7A to 7D is a schematic view showing, in a time-series manner, how the interior of the combustion chamber 16 is before and after a compression top dead center in the case where fuel is injected from the fuel injection valves 2 and 3 and ignition is carried out by the ignition plug 4 at the timings shown in FIG. 5 respectively.

Figure 7A:
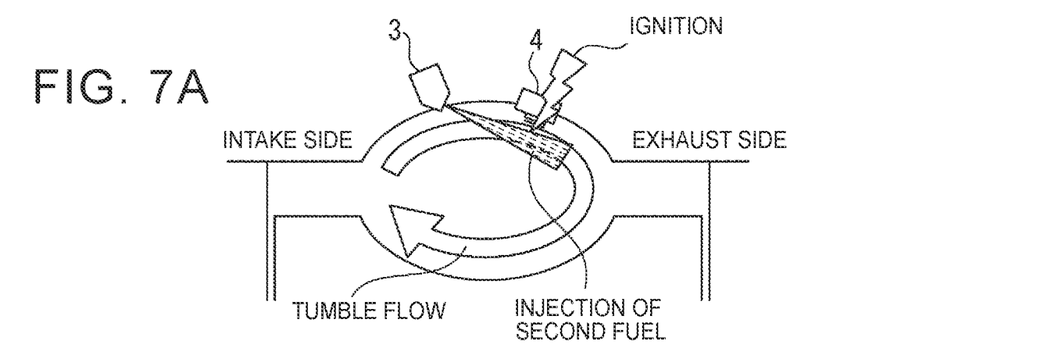
FIG. 7A is a schematic view showing in a time-series manner how the interior of a combustion chamber 16 is before and after a compression top dead center in the case where fuel is injected from fuel injection valves 2 and 3 and ignition is carried out by an ignition plug 4 at timings shown in FIG. 5 respectively.

FIG. 7A shows how second fuel for assisting ignition is injected from the second fuel injection valve 3, the second air-fuel mixture is temporarily formed in the vicinity of the electrode portion 4a of the ignition plug 4, and the second air-fuel mixture is ignited in a compression stroke after the formation of the first air-fuel mixture in the combustion chamber 16.

Figure 7B:
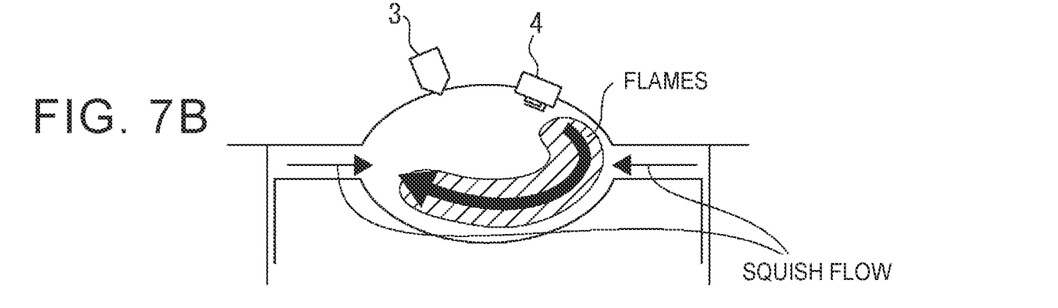
FIG. 7B is another schematic view showing in a time-series manner how the interior of the combustion chamber 16 is before and after the compression top dead center in the case where fuel is injected from the fuel injection valves 2 and 3 and ignition is carried out by the ignition plug 4 at the timings shown in FIG. 5 respectively.
Figure 7C:
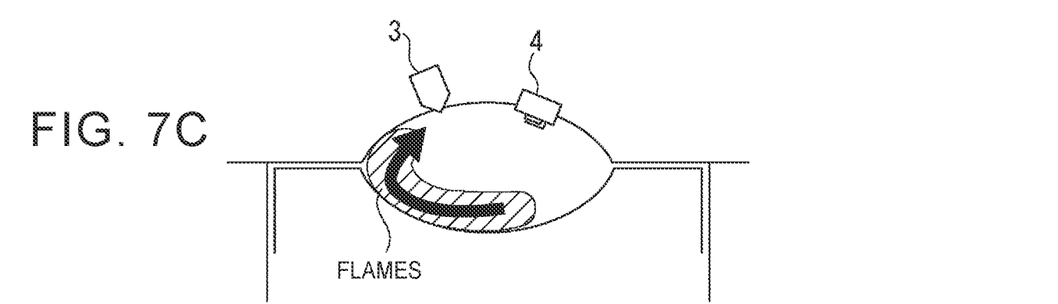
FIG. 7C is still another schematic view showing in a time-series manner how the interior of the combustion chamber 16 is before and after the compression top dead center in the case where fuel is injected from the fuel injection valves 2 and 3 and ignition is carried out by the ignition plug 4 at the timings shown in FIG. 5 respectively.
Figure 7D:
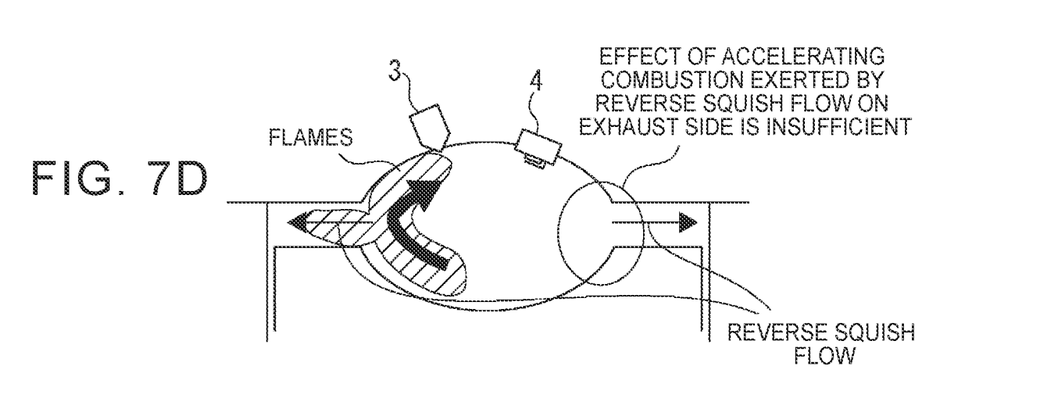
FIG. 7D is still another schematic view showing in a time-series manner how the interior of the combustion chamber 16 is before and after the compression top dead center in the case where fuel is injected from the fuel injection valves 2 and 3 and ignition is carried out by the ignition plug 4 at the timings shown in FIG. 5 respectively.

Each of FIGS. 7B to 7D shows how flame propagation progresses while flames produced by igniting the second air-fuel mixture drift on a tumble flow. The flames produced by igniting the second air-fuel mixture propagate at low speed because the first air-fuel mixture is lean. Therefore, as shown in FIGS. 7B to 7D, there is realized a combustion mode in which the flames produced by igniting the second air-fuel mixture propagate while drifting on the tumble flow from the exhaust side to the intake side.

In the process of the drift of these flames, as shown in FIG. 7B, there is a flame region on the exhaust side (on the right side in FIG. 7B), and the squish flow on the exhaust side boosts the degree of turbulence of the flames to accelerate combustion, immediately after an ignition timing in the second half of a compression stroke. Then after that, the flames drift to the intake side on the tumble flow as shown in FIG. 7C, and the flame region exists on the intake side (on the left side in FIG. 7D) immediately after a compression top dead center as shown in FIG. 7D.

Therefore, on the intake side, the degree of turbulence of flames can be boosted by the reverse squish flow on the intake side, and the flames can also be drawn into the squish area 16a on the intake side by the reverse squish flow. Therefore, the combustion in the squish area 16a on the intake side can be accelerated.

On the other hand, there is no flame region on the exhaust side, and there is an influence of the squish flow produced earlier. Therefore, the flames are unlikely to be drawn into the squish area 16a on the exhaust side even when a reverse squish flow is produced. Therefore, combustion cannot be accelerated in the squish area 16a on the exhaust side, and the amount of unburnt HC in exhaust gas increases.

Thus, in the present embodiment, the combustion in the squish area 16a on the exhaust side is accelerated by injecting third fuel for accelerating combustion in the squish area 16a on the exhaust side from the second fuel injection valve 3 prior to the second fuel, and igniting the second air-fuel mixture formed by the second fuel and a third air-fuel mixture formed by the third fuel separately, at the time of the lean combustion mode, as shown in FIGS. 8A to 8E.

Figure 8A:
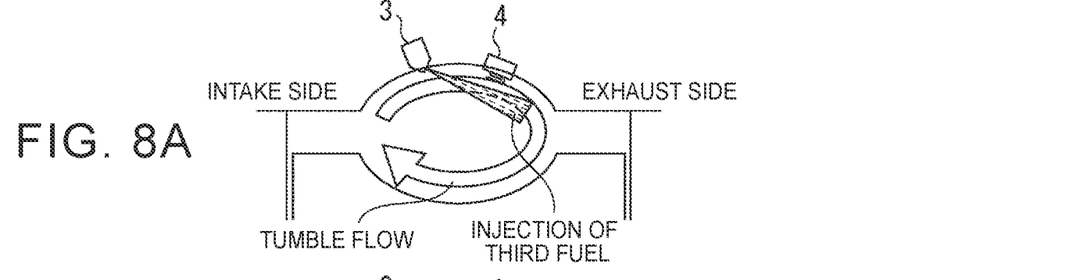
FIG. 8A is a schematic view showing in a time-series manner how the interior of the combustion chamber 16 is before and after a compression top dead center at the time of a lean combustion mode according to one of the embodiments of the disclosure.

In concrete terms, in the present embodiment, the third fuel is injected from the second fuel injection valve 3 at a timing before an injection timing of the second fuel in a compression stroke after the formation of the first air-fuel mixture in the combustion chamber 16, and the third air-fuel mixture for producing flames for accelerating combustion in the squish area 16a on the exhaust side by being ignited after being drifted round in the combustion chamber 16 on the tumble flow is thereby formed, as shown in FIG. 8A.

Figure 8B:
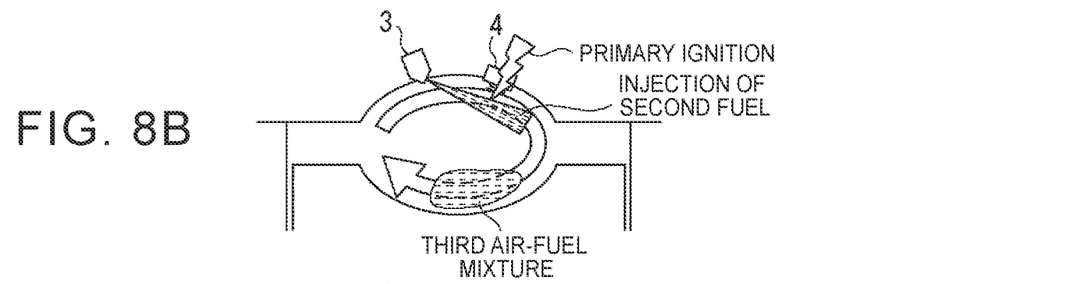
FIG. 8B is another schematic view showing in a time-series manner how the interior of the combustion chamber 16 is before and after the compression top dead center at the time of the lean combustion mode according to the embodiment of the disclosure.

Subsequently, the second fuel is injected from the second fuel injection valve 3 to temporarily form the second air-fuel mixture in the vicinity of the electrode portion 4a of the ignition plug 4, and the second air-fuel mixture is ignited, in the same manner as described previously with reference to FIGS. 7A to 7D, in a compression stroke after the formation of the first air-fuel mixture and the third air-fuel mixture in the combustion chamber 16, as shown in FIG. 8B.

Figure 8C:
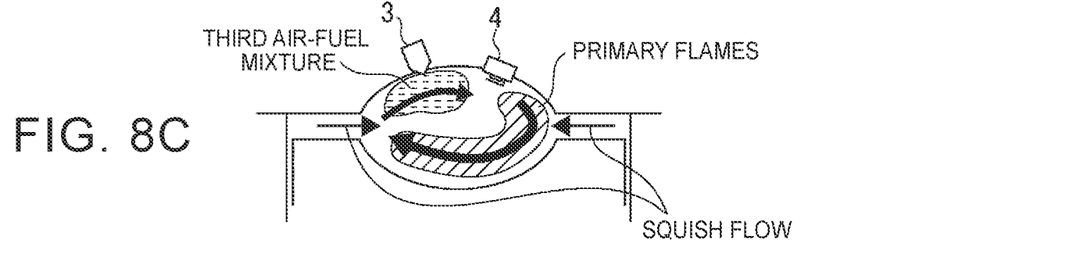
FIG. 8C is still another schematic view showing in a time-series manner how the interior of the combustion chamber 16 is before and after the compression top dead center at the time of the lean combustion mode according to the embodiment of the disclosure.

Thus, flame propagation progresses while the flames produced by igniting the second air-fuel mixture (hereinafter referred to as "primary flames") drift on the tumble flow in the same manner as described previously with reference to FIGS. 7A to 7D, and the flame region is thereby enlarged, as shown in FIG. 8C. On the other hand, the third air-fuel mixture has already drifted from the exhaust side toward the intake side along the crest surface of the piston on the tumble flow, so the primary flames do not propagate, as shown in FIG. 8B. The third air-fuel mixture further drifts from the intake side to the exhaust side along the top surface of the combustion chamber 16 on the tumble flow, as shown in FIG. 8C.

Figure 8D:
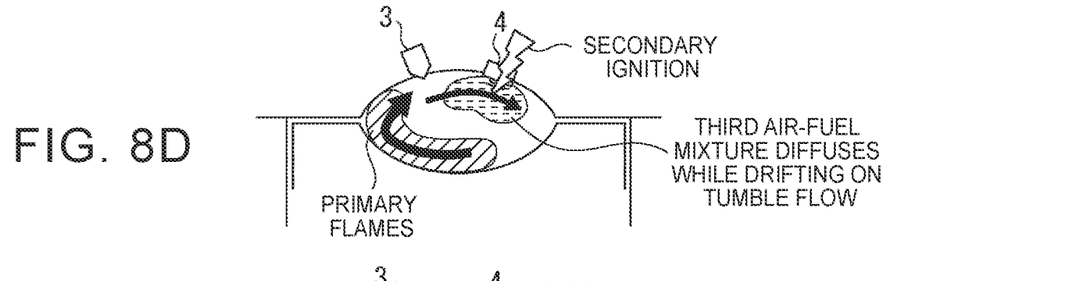
FIG. 8D is still another schematic view showing in a time-series manner how the interior of the combustion chamber 16 is before and after the compression top dead center at the time of the lean combustion mode according to the embodiment of the disclosure.

The third air-fuel mixture is then ignited at a timing immediately before a compression top dead center when the third air-fuel mixture reaches the vicinity of the electrode portion 4a of the ignition plug 4 after drifting round in the combustion chamber 16 on the tumble flow, as shown in FIG. 8D.

Figure 8E:
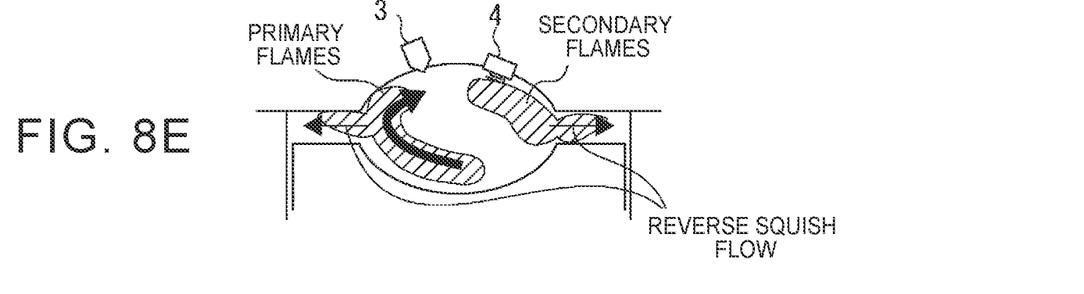
FIG. 8E is still another schematic view showing in a time-series manner how the interior of the combustion chamber 16 is before and after the compression top dead center at the time of the lean combustion mode according to the embodiment of the disclosure.

Thus, flames produced by igniting the third air-fuel mixture (hereinafter referred to as "secondary flames") can be made present on the exhaust side where there are no flames in FIG. 7A to FIG. 7D as described previously, immediately after the compression top dead center, as shown in FIG. 8E.

Therefore, the primary flames present on the intake side can be drawn into the squish area 16a on the intake side by the reverse squish flow, and the secondary flames present on the exhaust side can be drawn into the squish area 16a on the exhaust side by the reverse squish flow. Therefore, the combustion in the squish area 16a on the exhaust side as well as on the intake side can be accelerated. Therefore, the amount of unburnt HC in exhaust gas can be restrained from increasing.

Figure 9:
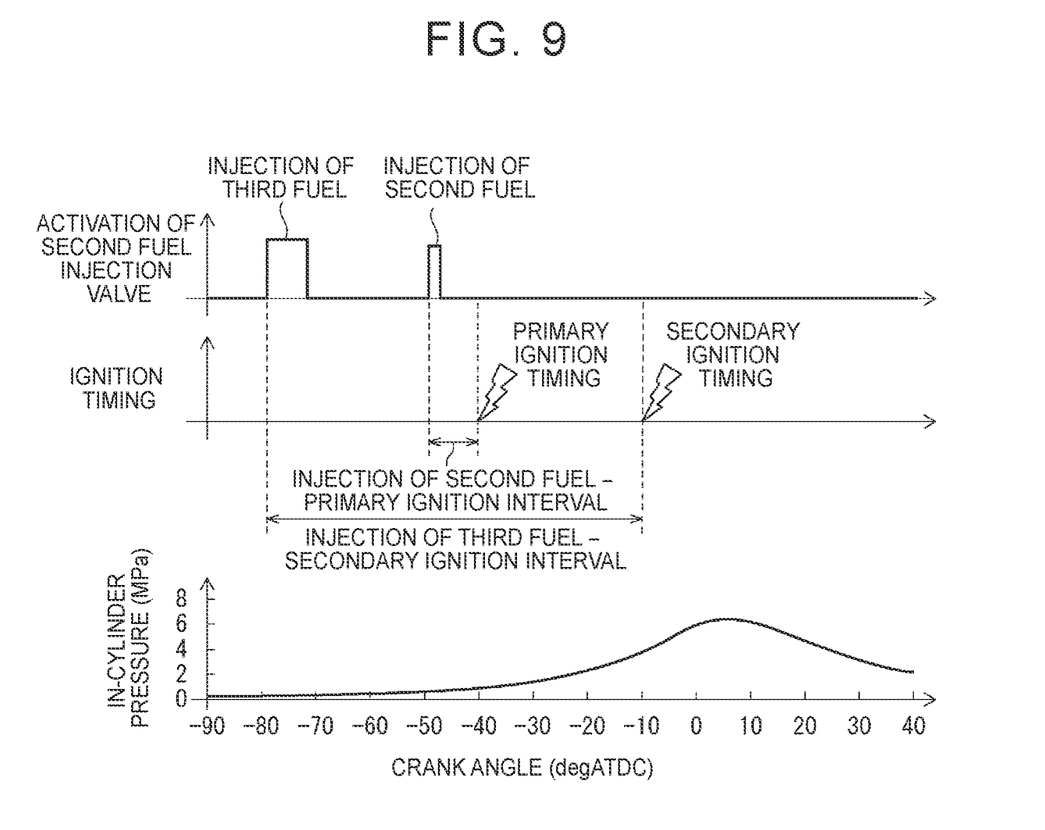
FIG. 9 is a view showing an example of a fuel injection timing of the second fuel injection valve and a timing of ignition by the ignition plug at the time of the lean combustion mode for realizing the combustion shown in FIG. 8A, FIG. 8B, FIG. 8C, FIG. 8D, and FIG. 8E, in combination with in-cylinder pressure (MPa), with an axis of abscissa representing crank angle (deg. ATDC)

FIG. 9 is a view showing an example of a fuel injection timing of the second fuel injection valve 3 and a timing of ignition by the ignition plug 4 at the time of the lean combustion mode for realizing the combustion shown in FIGS. 8A to 8E, in combination with in-cylinder pressure (MPa), with the axis of abscissa representing crank angle (deg. ATDC). Incidentally, the fuel injection timing of the first fuel injection valve 2 is the same as in FIG. 3A and FIG. 3B, and hence is not depicted in FIG. 9.

In FIG. 9, the second air-fuel mixture is ignited at a primary ignition timing, and the third air-fuel mixture is ignited at a secondary ignition timing.

The primary ignition timing is basically set as an optimal ignition timing, and is approximately set to a range from −50 (deg. ATDC) to −40 (deg. ATDC) in this example.

The injection timing of the second fuel is set as a timing that allows the second air-fuel mixture, namely, the air-fuel mixture for ignition having a higher fuel ratio than the first air-fuel mixture to be formed in the vicinity of the electrode portion 4a of the ignition plug 4 with respect to the primary ignition timing. In this example, the injection timing of the second fuel is set as a timing preceding the primary ignition timing by 10 (deg. crank angle (CA)).

The injection amount of the second fuel is an injection amount that allows the air excess ratio $\lambda_2$ of the second air-fuel mixture at the primary ignition timing to be held equal to an air excess ratio (e.g., 1.3 or less) that enables the ignition of the second air-fuel mixture. In this example, the injection amount of the second fuel is about 3% of the total fuel injection amount.

The secondary ignition timing is set as a timing that allows the secondary flames to be drawn into the squish area 16a on the exhaust side by the reverse squish flow. In the present embodiment, the secondary ignition timing is approximately set to −10 (deg. ATDC).

The injection timing of the third fuel is set with respect to the secondary ignition timing such that the timing when the third air-fuel mixture formed by the third fuel reaches the vicinity of the electrode portion 4a of the ignition plug 4 again after drifting round in the combustion chamber 16 on the tumble flow coincides with the secondary ignition timing.

Incidentally, the time needed for the third air-fuel mixture to reach the vicinity of the electrode portion 4a of the ignition plug 4 after drifting round in the combustion chamber 16 on the tumble flow changes depending on a tumble ratio. Therefore, the injection timing of the third fuel is set based on the secondary ignition timing and the tumble ratio. The time needed for the third air-fuel mixture to drift round in the combustion chamber 16 on the tumble flow is, for example, a time corresponding to about 90 (deg. CA) when the tumble ratio is 4, a time corresponding to about 72 (deg. CA) when the tumble ratio is 5, and a time corresponding to about 60 (deg. CA) when the tumble ratio is 6. In this example, the injection timing of the third fuel is set as a period preceding the secondary ignition timing by 80 to 70 (deg. CA).

The injection amount of the third fuel is an injection amount that allows an air excess ratio $\lambda_3$ of the third air-fuel mixture at the secondary ignition timing to be held equal to an air excess ratio (e.g., 2.0 or less) that enables the ignition of the third air-fuel mixture. It should be noted herein that the third air-fuel mixture diffuses to some extent while drifting round in the combustion chamber 16 on the tumble flow, and that the degree of diffusion of the third air-fuel mixture increases as the tumble ratio increases. Therefore, the injection amount that allows the air excess ratio $\lambda_3$ of the third air-fuel mixture at the secondary ignition timing to be held equal to the air excess ratio enabling ignition changes in accordance with the tumble ratio. The injection amount needs to be increased as the tumble ratio increases. In this example, the injection amount of the third fuel is set to about 20% of the total fuel injection amount. Incidentally, the air excess ratio that allows the third air-fuel mixture to be ignited is higher than the air excess ratio that allows the second air-fuel mixture to be ignited (i.e., the third air-fuel mixture is leaner than the second air-fuel mixture) because the secondary ignition timing that is the ignition timing of the third air-fuel mixture is closer to the compression top dead center than the primary ignition timing that is the ignition timing of the second air-fuel mixture, and the environment in the cylinder makes it easier to ignite the air-fuel mixture due to the primary flames that have already been produced.

Figure 10:
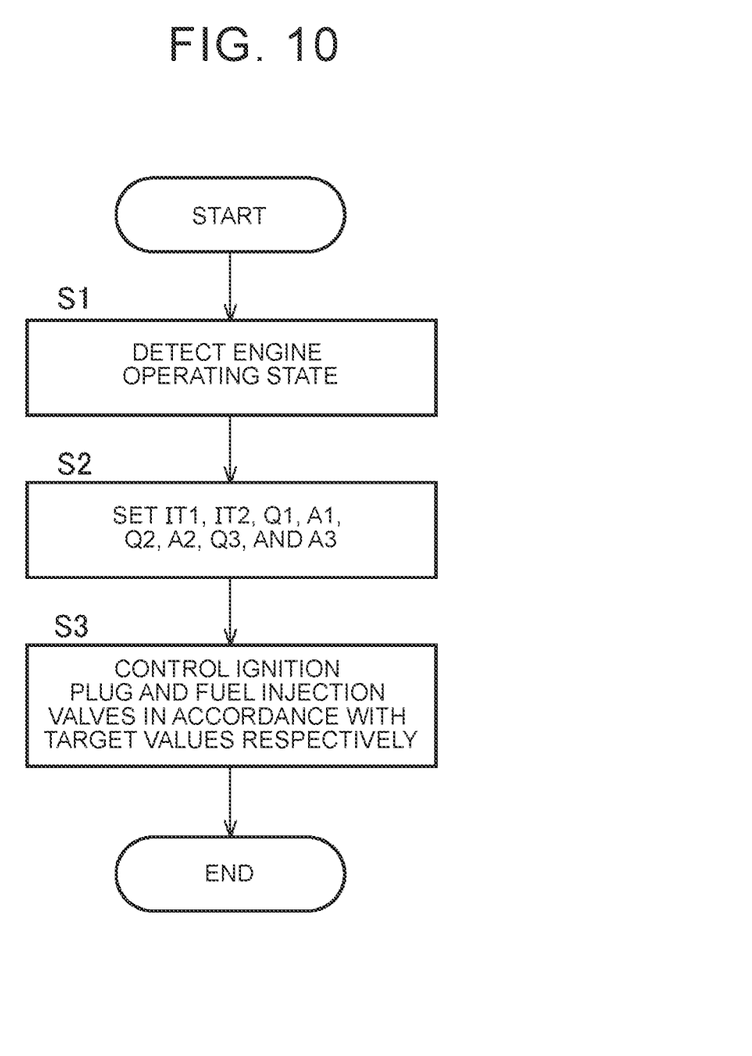
FIG. 10 is a flowchart illustrating the control of the fuel injection valves and the ignition plug that is performed at the time of the lean combustion mode.

FIG. 10 is a flowchart illustrating the control of the fuel injection valves 2 and 3 and the ignition plug 4 that is performed at the time of the lean combustion mode according to the present embodiment. The electronic control unit 200 repeatedly executes the present routine at the time of the lean combustion mode on a predetermined computation cycle.

In step S1, the electronic control unit 200 reads an engine rotational speed calculated based on an output signal of the crank angle sensor 212, and an engine load detected by the load sensor 211, and detects an engine operating state (an engine operating point prescribed by the engine rotational speed and the engine load).

In step S2, the electronic control unit 200 refers to a map or the like stored in advance in the ROM 202, and sets a primary ignition timing IT1 and a secondary ignition timing IT2 of the ignition plug, a target injection amount Q1 and a target injection timing A1 of the first fuel, a target injection amount Q2 and a target injection timing A2 of the second fuel, and a target injection amount Q3 and a target injection timing A3 of the third fuel, based on the engine operating state.

In step S3, the electronic control unit 200 controls the first fuel injection valve 2 such that the injection amount of the first fuel and the injection timing of the first fuel become equal to the target injection amount Q1 and the target injection timing A1 respectively, and controls the second fuel injection valve 3 such that the injection amount of the second fuel and the injection timing of the second fuel become equal to the target injection amount Q2 and the target injection timing A2 respectively, and that the injection amount of the third fuel and the injection timing of the third fuel become equal to the target injection amount Q3 and the target injection timing A3 respectively. Besides, the electronic control unit 200 controls the ignition plug 4 such that ignition is carried out at the primary ignition timing IT1 and the secondary ignition timing IT2.

The internal combustion engine 100 according to the present embodiment described above is equipped with the engine body 1 having the combustion chamber 16 in which the squish area 16a is formed, the ignition plug 4 having the electrode portion 4a arranged in such a manner as to face the combustion chamber 16, the first fuel injection valve 2 that injects fuel into the intake passage or the combustion chamber 16 of the engine body 1, the second fuel injection valve 3 that injects fuel into the combustion chamber 16, and the electronic control unit 200 (the control apparatus).

The engine body 1 is configured to be able to produce a tumble flow passing the electrode portion 4a in the combustion chamber 16. The second fuel injection valve 3 is configured to directly inject fuel toward the electrode portion 4a in the same direction as the flow direction of the tumble flow.

The electronic control unit 200 is configured to inject the first fuel for forming the first air-fuel mixture (the homogeneous air-fuel mixture) in the combustion chamber 16 from the first fuel injection valve 2, inject the second fuel (the fuel for ignition) for forming the second air-fuel mixture (the air-fuel mixture for ignition) in the vicinity of the electrode portion 4a from the second fuel injection valve 3, ignite the second air-fuel mixture at the primary ignition timing, and thus carry out lean combustion in which primary flames produced by igniting the second air-fuel mixture are propagated to the first air-fuel mixture while being drifted on the tumble flow.

Besides, the electronic control unit 200 is configured to inject the third fuel (the fuel for accelerating combustion) for accelerating combustion in the squish area 16a from the second fuel injection valve 3 at a timing before the injection timing of the second fuel, and ignite the third air-fuel mixture (the fuel for accelerating combustion) formed by the third fuel at the secondary ignition timing after the primary ignition timing by drifting the third air-fuel mixture in the combustion chamber 16 on the tumble flow.

Moreover, the secondary ignition timing is set as a timing that allows secondary flames produced by igniting the third air-fuel mixture to be drawn into the squish area 16a by a reverse squish flow.

Thus, while the primary flames produced at the primary ignition timing can be drifted to one side (the intake side in the present embodiment) of the combustion chamber 16 on the tumble flow, the secondary flames produced at the secondary ignition timing after the primary ignition timing can be made present on the other side (the exhaust side in the present embodiment) of the combustion chamber 16. Furthermore, since the secondary ignition timing is set as a timing that allows the secondary flames to be drawn into the squish area 16a by the reverse squish flow, the primary flames can be drawn into the squish area 16a by the reverse squish flow produced on one side of the combustion chamber 16, and the secondary flames can be drawn into the squish area 16a by the reverse squish flow produced on the other side of the combustion chamber 16. Therefore, the combustion in the squish area 16a can be accelerated as a whole, so the amount of unburnt HC in exhaust gas can be restrained from increasing.

Besides, in the present embodiment, the injection timing of the fuel for accelerating combustion is set as a timing when the secondary ignition timing and the timing when the third air-fuel mixture (the fuel for accelerating combustion) returns to the vicinity of the electrode portion 4a after drifting round in the combustion chamber 16 on the tumble flow overlap with each other. Thus, the third fuel injected from the second fuel injection valve 3 prior to the second fuel can be appropriately ignited at the secondary ignition timing after the ignition timing of the second air-fuel mixture formed by the second fuel (the primary ignition timing).

Besides, the second fuel injection valve 3 according to the present embodiment has the two injection holes 3a and 3b from which fuel is directly injected toward the electrode portion 4a in the same direction as the flow direction of the tumble flow, and the two injection holes 3a and 3b are provided such that the angle between centers of sprays of fuel injected from the injection holes 3a and 3b respectively becomes equal to or smaller than 30°. Thus, the sprays of fuel injected from the injection holes 3a and 3b respectively pull each other while involving ambient air, so the direction of each of the sprays of fuel can be made to accurately coincide with the direction of the electrode portion 4a of the ignition plug 4.

Therefore, the second air-fuel mixture can be reliably formed in the vicinity of the electrode portion 4a of the ignition plug 4 and ignited, so the occurrence of a misfire can be prevented to ensure the combustion stability of the stratified air-fuel mixture. Besides, accurate coincidence with the flow direction of the tumble flow can also be realized, so the occurrence of circumstances where the third air-fuel mixture does not ride on the tumble flow and hence cannot be ignited can be suppressed as well.

The embodiment of the disclosure has been described above. However, the foregoing embodiment is nothing more than the partial presentation of application examples of the disclosure, and is not intended to limit the technical scope of the disclosure to the concrete configuration thereof.

For example, in the foregoing embodiment, the second fuel injection valve 3 is arranged between the intake ports 17a and 17b, and the ignition plug 4 is arranged between the exhaust ports 18a and 18b. However, it is also acceptable to reverse the orientation of the tumble flow in the present embodiment, arrange the ignition plug 4 between the intake ports 17a and 17b, arrange the second fuel injection valve 3 between the exhaust ports 18a and 18b, and inject fuel from the second fuel injection valve 3 toward the electrode portion 4a of the ignition plug 4 in the same direction as the flow direction of the tumble flow. That is, the attachment positions of the second fuel injection valve 3 and the ignition plug 4 and the direction of the tumble flow can be altered as appropriate as long as an effect of restraining the amount of unburnt HC in exhaust gas from increasing can be obtained by accelerating combustion in the squish area 16a as a whole.

For example, in the foregoing embodiment, the internal combustion engine 100 is equipped with the first fuel injection valve 2 for forming the homogeneous air-fuel mixture in the combustion chamber 16, and the second fuel injection valve 3 for forming the air-fuel mixture for ignition in the combustion chamber 16. However, a single fuel injection valve as an integration of the first fuel injection valve 2 and the second fuel injection valve 3 may be provided to enable the injection of fuel into the combustion chamber 16, as long as this single fuel injection valve is configured to be able to change the number of injection holes and the needle lift amount freely and can fulfill the injection performance required of the first fuel injection valve 2 and the injection performance required of the second fuel injection valve 3 at the same time.

Incidentally, in the foregoing embodiment, the first fuel injection valve 2 for forming the homogeneous air-fuel mixture in the combustion chamber 16 is provided separately from the second fuel injection valve 3 for forming the air-fuel mixture for ignition in the combustion chamber 16 because of the following reason.

As described previously, the fuel injection rate of the second fuel injection valve 3 needs to be confined within a certain range in order to form the appropriate second air-fuel mixture having the air excess ratio that allows the second air-fuel mixture to be stably ignited by the ignition plug 4 and that allows the discharge amount of NOx to be held equal to or smaller than the first target level or the second target level.

Then, in the case where the fuel injection rate of the second fuel injection valve 3 is confined within a certain range, an attempt to inject the first fuel for forming the homogeneous air-fuel mixture in the combustion chamber 16 by the second fuel injection valve 3 separately from the second fuel without providing the first fuel injection valve 2 makes it impossible to finish injecting a total amount of fuel needed to form the homogeneous air-fuel mixture within a fuel injection period in which the homogeneous air-fuel mixture can be formed, because the fuel injection rate is too low when the target fuel injection amount increases in response to an increase in required torque, namely, when the amount of fuel for forming the homogeneous air-fuel mixture injected from the second fuel injection valve 3 (i.e., the first fuel amount) increases. Therefore, in each of the foregoing embodiments, both the first fuel injection valve 2 for forming the homogeneous air-fuel mixture in the combustion chamber 16 and the second fuel injection valve 3 for forming the air-fuel mixture for ignition in the combustion chamber 16 are used.

Besides, in the foregoing embodiment, there is no need to carry out lean combustion in which the amount of the second fuel (the fuel for ignition) is set to an infinitesimal amount in the entirety of the engine operating region for carrying out lean combustion with the air excess ratio equal to or higher than 2.0. For example, lean combustion may be carried out only in a predetermined engine operating region where it is desirable to restrain NOx from being discharged while ensuring the stability of combustion.

What is claimed is:

1. An internal combustion engine comprising:
an engine body having a combustion chamber in which a squish area is formed;
an ignition plug in which an electrode portion is arranged in such a manner as to face the combustion chamber;
a first fuel injection valve that injects fuel into an intake passage or the combustion chamber of the engine body;
a second fuel injection valve that injects fuel into the combustion chamber; and
a control apparatus, wherein
the engine body is configured to be able to produce a tumble flow passing the electrode portion in the combustion chamber,
the second fuel injection valve is configured to directly inject fuel toward the electrode portion in the same direction as a flow direction of the tumble flow,
the control apparatus is configured to carry out lean combustion to cause flame propagation to a homogeneous air-fuel mixture while drifting primary flames produced by igniting an air-fuel mixture for ignition on the tumble flow, by injecting fuel for forming the homogeneous air-fuel mixture from the first fuel injection valve into the combustion chamber, and injecting fuel for ignition for forming the air-fuel mixture for ignition from the second fuel injection valve to a vicinity of the electrode portion to ignite the air-fuel mixture for ignition at a primary ignition timing,
the control apparatus is further configured to inject, from the second fuel injection valve, fuel for accelerating combustion in the squish area at a timing before an injection timing of the fuel for ignition, and ignite an air-fuel mixture for accelerating combustion that is formed by the fuel for accelerating combustion at a secondary ignition timing after the primary ignition timing by drifting the air-fuel mixture for accelerating combustion in the combustion chamber on the tumble flow, and
the secondary ignition timing is set as a timing that allows secondary flames produced by igniting the air-fuel mixture for accelerating combustion to be drawn into the squish area by a reverse squish flow.

2. The internal combustion engine according to claim 1, wherein
the injection timing of the fuel for accelerating combustion is set as a timing when the secondary ignition timing and a timing when the air-fuel mixture for accelerating combustion returns to the vicinity of the electrode portion on the tumble flow overlap with each other.

3. The internal combustion engine according to claim 1, wherein
the second fuel injection valve has two injection holes from which fuel is directly injected toward the electrode portion in the same direction as the flow direction of the tumble flow, and
the two injection holes are provided such that an angle between centers of sprays of fuel injected from the two injection holes respectively becomes equal to or smaller than 30°.

4. The internal combustion engine according to claim 1, wherein
the control apparatus is configured to carry out the lean combustion with an air excess ratio equal to or higher than 2.0.

* * * * *